US008769396B2

(12) United States Patent
Chen et al.

(10) Patent No.: US 8,769,396 B2
(45) Date of Patent: Jul. 1, 2014

(54) CALIBRATION AND ANNOTATION OF VIDEO CONTENT

(75) Inventors: Billy Chen, Bellevue, WA (US); Eyal Ofek, Redmond, WA (US); Bo Zhang, Beijing (CN); Ying-Qing Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 12/479,673

(22) Filed: Jun. 5, 2009

(65) Prior Publication Data
US 2010/0313113 A1    Dec. 9, 2010

(51) Int. Cl.
  *G06F 17/00*    (2006.01)
(52) U.S. Cl.
  USPC .......................................... 715/232; 715/229
(58) Field of Classification Search
  CPC ............................. G06F 3/14; G06F 17/30241
  USPC .................. 715/205, 230, 231, 232, 754, 780
  See application file for complete search history.

(56) References Cited

U.S. PATENT DOCUMENTS

| | | | |
|---|---|---|---|
| 6,512,857 B1 | 1/2003 | Hsu et al. | |
| 7,502,490 B2 | 3/2009 | Rhoads et al. | |
| 7,831,928 B1 * | 11/2010 | Rose et al. | 715/810 |
| 8,131,118 B1 * | 3/2012 | Jing et al. | 382/305 |
| 8,185,543 B1 * | 5/2012 | Choudhry et al. | 715/772 |
| 2005/0273725 A1 * | 12/2005 | Russon et al. | 715/780 |
| 2007/0044010 A1 * | 2/2007 | Sull et al. | 715/500.1 |
| 2007/0244634 A1 * | 10/2007 | Koch et al. | 701/207 |
| 2008/0052634 A1 * | 2/2008 | Fishkin et al. | 715/753 |
| 2008/0120166 A1 * | 5/2008 | Fernandez et al. | 705/10 |
| 2008/0195657 A1 * | 8/2008 | Naaman et al. | 707/104.1 |
| 2008/0240616 A1 | 10/2008 | Haering et al. | |
| 2009/0164462 A1 * | 6/2009 | Snijder | 707/5 |
| 2010/0076968 A1 * | 3/2010 | Boyns et al. | 707/732 |
| 2010/0250136 A1 * | 9/2010 | Chen | 701/300 |

OTHER PUBLICATIONS

Chen, Billy et al., "Interactive Techniques for Registering Images to Digital Terrain and Building Models", Retrieved from: <http://research.microsoft.com/pubs/70622/tr-2008-115.pdf> on Mar. 24, 2009, Tech. rep., Virtual Earth Live Labs, Microsoft Research.,(Aug. 2008),10 pages.

(Continued)

*Primary Examiner* — Doug Hutton, Jr.
*Assistant Examiner* — Ariel Mercado
(74) *Attorney, Agent, or Firm* — Steve Spellman; Jim Ross; Micky Minhas (57) ABSTRACT

Various embodiments provide techniques for calibrating and annotating video content. In one or more embodiments, an instance of video content can be calibrated with one or more geographical models and/or existing calibrated video content to correlate the instance of video content with one or more geographical locations. According to some embodiments, geographical information can be used to annotate the video content. Geographical information can include identification information for one or more structures, natural features, and/or or locations included in the video content. Some embodiments enable a particular instance of video content to be correlated with other instances of video content based on common geographical information and/or common annotation information. Thus, a user can access video content from other users with similar travel experiences and/or interests. A user may also access annotations provided by other users that may be relevant to a particular instance of video content.

20 Claims, 8 Drawing Sheets

(56) References Cited

OTHER PUBLICATIONS

Pongnumkul, Suporn et al., "Creating Map-Based Storyboards for Browsing Tour Videos", *In UIST '08: Proceedings of the 21st Annual ACM Symposium on User Interface Software and Technology, ACM, New York, NY, USA*, (2008),pp. 1-10.

Toyama, K. et al., "Geographic Location Tags on Digital Images", *ACM International Conference on Multimedia.*, (2003),11.

"Erdas Imagine", Retrieved at <<http://gi.leica-geosystems.com/documents/pdf/ERDAS_IMAGINE_9.1_Brochure.pdf>>, pp. 6.

Kumar, et al., "Registration of Video to Geo-Referenced Imagery", Retrieved at <<http://ieeexplore.ieee.org/stamp/stamp.jsp?arnumber=00711963>>, Proceedings of the 14th International Conference on Pattern Recognition, vol. 2, 1998, pp. 1-8.

Laganiere, et al., "Real-Time Label Insertion in Live Video through Online Trifocal Tensor Estimation", Retrieved at <<http://www.site.uottawa.ca/~laganier/publications/labelsVISAPP06.pdf>>, In International Conference on Computer Vision Theory and Applications, Mar. 2006, pp. 435-441.

Ding, et al., "Automatic Registration of Aerial Imagery with Untextured 3D LiDAR Models", Retrieved at <<http://www-video.eecs.berkeley.edu/papers/ding/cvpr-2008.pdf>>, IEEE Conference on Computer Vision and Pattern Recognition, Jun. 23-28, 2008, pp. 8.

Cao, et al., "Automatic Geo-Registration of Maritime Video Feeds", Retrieved at <<http://figment.cse.usf.edu/~sfefilat/data/papers/TuBCT8.18.pdf>>, 19th International Conference on Pattern Recognition, Dec. 8-11, 2008, pp. 4.

Boer, Arnoud De, "Label Placement in 3D Georeferenced and Oriented Digital Photographs using GIS Technology", Retrieved at <<http://www.tudelft.nl/live/pagina.jsp?id=bc0d1da6-4b36-464a-9b4d-3f7d5ca66029&lang=en&binary=/doc/Label_placement_digital_photographs.pdf>>, MSc. Geomatics thesis, Delft University of Technology, Dec. 2007, pp. 136.

Ay, et al., "Viewable Scene Modeling for Geospatial Video Search", Retrieved at <<http://www.bibsonomy.org/bibtex/2030610accad93438ecfb06a77b040322/dblp>>, In: ACM MultimediaACM, 2008, p. 1.

Cho, Peter L., "3D Organization of 2D Urban Imagery", Retrieved at <<http://ieeexplore.ieee.org/stamp/stamp.jsp?arnumber=04476116>>, 36th Applied Imagery Pattern Recognition Workshop, Oct. 10-12, 2007, pp. 3-8.

Kopf, et al., "Deep Photo: Model-Based Photograph Enhancement and Viewing", Retrieved at <<http://johanneskopf.de/publications/deep_photo/>>, ACM Transactions on Graphics, Proceedings of SIGGRAPH Asia, vol. 27, No. 5, 2008, pp. 1-1.

Luan, et al., "Annotating Gigapixel Images", Retrieved at <<http://luanqing1021.googlepages.com/tn200-luan_FromEditorFinal.pdf>>, Proceedings of the 21st annual ACM symposium on User interface software and technology Oct. 19-22, 2008, pp. 4.

Szeliski, Richard, "Image Alignment and Stitching: A Tutorial", Retrieved at <<http://www1.cs.columbia.edu/~belhumeur/courses/compPhoto/szeliski.pdf>>, Technical Report, MSR-TR-2004-92, Jan. 26, 2005, pp. 71.

Zitova, et al., "Image Registration Methods: A Survey", Retrieved at <<http://library.utia.cas.cz/prace/20030125.pdf>>, Image and Vision Computing, vol. 21, No. 11, Oct. 2003, pp. 977-1000.

Snavely, et al., "Photo Tourism: Exploring Photo Collections in 3D", Retrieved at <<http://phototour.cs.washington.edu/Photo_Tourism.pdf>>, International Conference on Computer Graphics and Interactive Techniques, Jul. 30-Aug. 3, 2006, pp. 12.

Lowe, David G., "Distinctive Image Features from Scale-Invariant Keypoints", Retrieved at <<http://www.cs.ubc.ca/~lowe/papers/ijcv04.pdf>>, Jan. 5, 2004, pp. 1-28.

"Virtual Earth", Retrieved at <<http://maps.live.com/>>, Mar. 25, 2009, p. 1.

"Google Maps", Retrieved at <<http://maps.google.com>>, Mar. 25, 2009, p. 1.

Shah, Mubarak et al., "Video Registration", Kluwer. Eds. 2003,(2003),30 pages.

* cited by examiner

| | Attribute | Yes/No |
|---|---|---|
| 1 | Restaurant | No |
| 2 | Museum | No |
| 3 | Historical | Yes |
| 4 | Children's | Yes |
| 2 | Shopping | No |
| 3 | Waterfront | No |
| 4 | Large Structure | No |
| 4 | Urban | Yes |
| 5 | Outdoor Activities | Yes |

CALIBRATION AND ANNOTATION OF VIDEO CONTENT

BACKGROUND

Many modern devices are capable of capturing video content. After video content is captured, a user may want to annotate the video content. For example, a user may want to label buildings, natural features, or other points of interest that are included as part of the video content. Some currently available techniques for video content annotation are time intensive and simply enable a user to attach static labels to video content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for calibrating and annotating video content. In one or more embodiments, an instance of video content can be calibrated with one or more geographical models, with existing calibrated video content, and/or using position and orientation sensors in a video capture device to correlate the instance of video content with one or more geographical locations. In some implementations, a user can access one or more of the user's videos based on a location associated with the video. In one or more embodiments, annotations can be added to video content. For example, annotations can include geographical information about the video content, such as identification information for one or more structures, natural features, and/or locations included in the video content. Geographical information can be retrieved from a geographical model, pre-existing calibrated video content, a geographical database, and so on.

Some embodiments enable a particular instance of video content to be correlated with other instances of video content based on common geographical information (e.g., locations) and/or common annotation information. Thus, a user can access video content from other users with similar travel experiences and/or interests. A user may also access annotations provided by other users that may be relevant to a particular instance of video content.

BRIEF DESCRIPTION OF THE DRAWINGS

The same numbers are used throughout the drawings to reference like features.

DETAILED DESCRIPTION

Overview

Various embodiments provide techniques for calibrating and annotating video content. In one or more embodiments, an instance of video content can be calibrated with one or more geographical models and/or existing calibrated video content to correlate the instance of video content with one or more geographical locations. Suitable examples of geographical models include three-dimensional geographical models, triangular mesh geographical models, and so on. A suitable geographical model can associate position information with particular geographical images and/or representations of geographical images. Calibrating video content with a geographical model can allow the video content to be calibrated to the geographical model such that features of the video content correspond to similar features of the geographical model. For example, video content that includes the Eiffel Tower can be calibrated with a geographical model such that an image of the Eiffel Tower included in the video content corresponds to a representation of the Eiffel Tower included as part of the geographical model. In some embodiments, a user can access a video by specifying, such as by using a search function, a location that is included in the video, e.g., the Eiffel Tower.

In one or more embodiments, geographical information associated with a geographical model and/or existing calibrated video content can be used to annotate the video content. Geographical information can include identification information for one or more structures, natural features, and/or locations included in the video content. By calibrating video content with a geographical model, annotations of the video content can track with visual aspects of the video content when images included in the video content move. For example, if an image of the Eiffel Tower in the video content is annotated "Eiffel Tower" and the video image pans away from the Eiffel Tower, the annotation can track with the image of the Eiffel Tower until the image is panned out of a current frame of the video content.

According to some embodiments, techniques are provided for ranking annotations that are available for annotating video content. For example, feedback can be received from a user regarding one or more video annotations. The feedback can indicate that a user prefers or does not prefer a particular annotation and/or category of annotations. The feedback can be used to ascertain criteria that can then be used to filter annotations such that only annotations that satisfy the criteria are added to the video content.

Some embodiments enable a particular instance of video content to be correlated with other instances of video content based on common geographical information and/or common annotation information. For example, if geographical information associated with a particular instance of video content indicates that the video content includes an image of the Golden Gate Bridge, another instance of content can be located that also includes an image of the Golden Gate Bridge. In another example, if annotation feedback indicates that a particular user likes art museums, instances of video content can be located that include images of art museums and/or annotations associated with art museums. Thus, a user can access video content from other users with similar travel experiences and/or interests. A user may also access annotations provided by other users that may be relevant to a particular instance of video content.

In the discussion that follows, a section entitled "Operating Environment" describes but one environment in which the various embodiments can be employed. Following this, a section entitled "Example Methods" describes example methods in accordance with one or more embodiments. Next, a section entitled "Example User Interface" describes one example user interface in accordance with one or more embodiments. Following this, a section entitled "User Preference Attributes" describes examples of attributes that can be used to determine user preferences in accordance with one or more embodiments. Last, a section entitled "Example System" is provided and describes an example system that can be used to implement one or more embodiments.

Operating Environment

Figure 1:
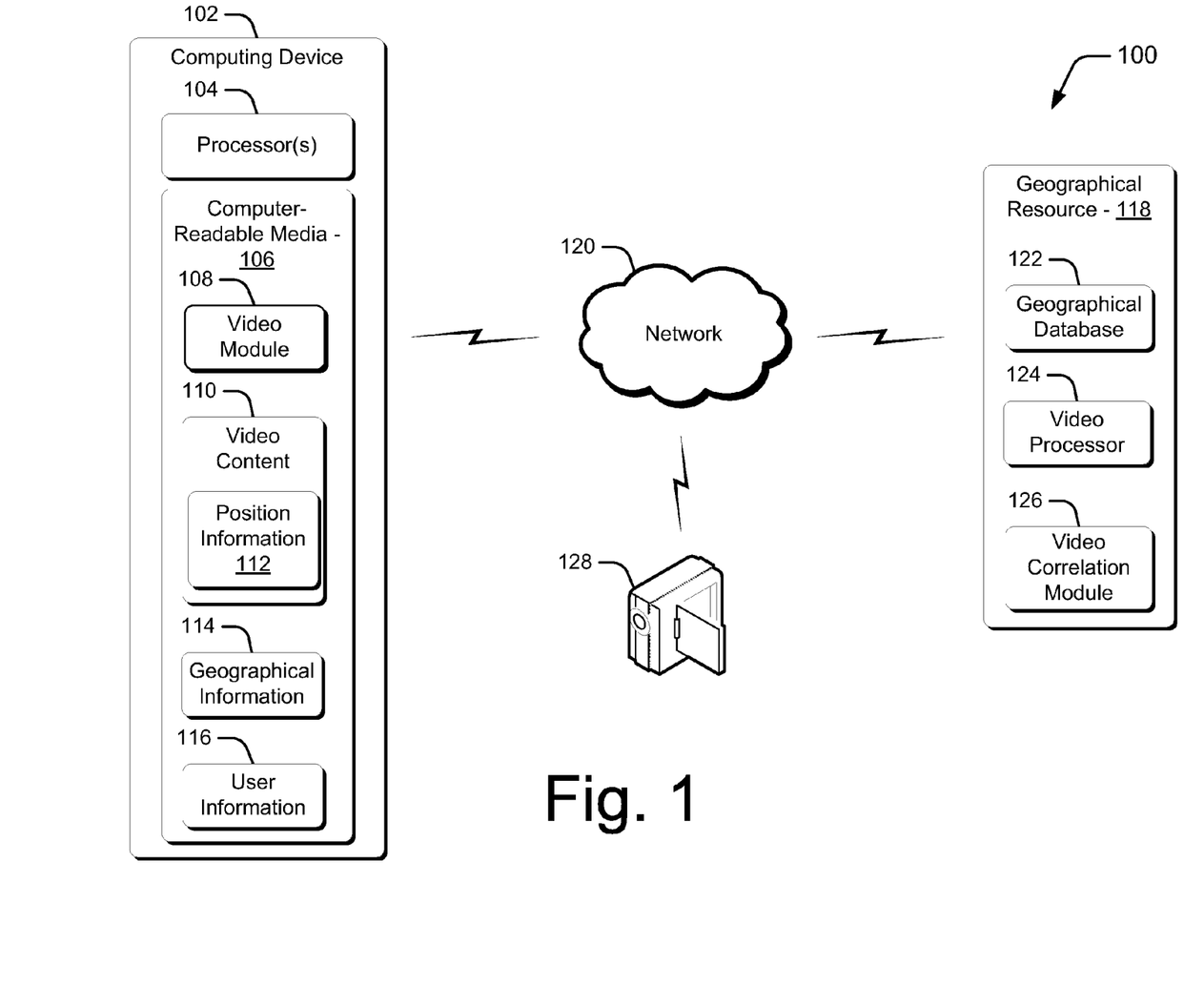
FIG. 1 illustrates an operating environment in which the inventive principles can be employed in accordance with one or more embodiments.

FIG. 1 illustrates an operating environment in accordance with one or more embodiments, generally at 100. Environment 100 includes a computing device 102 having one or more processors 104 and one or more computer-readable storage media 106. The computer-readable storage media 106 can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 8.

The computing device 102 also includes various types of software applications that can implement the functionality described herein. One such application is a video module 108 that is configured to process and/or play back video content 110 that resides on the computer-readable storage media 106. The video content 110 can include any suitable type of video content, such as digital video, analog video, and so on. The video content 110 includes position information 112 that can be used to determine a position where a particular frame of the video content 110 was captured, a position of one or more images within the video content 110, and/or a direction of movement associated with one or more frames of the video content 110. Examples of the position information 112 include Global Positioning System (GPS) information, inertial measurement unit (IMU) information, GLONASS information, Galileo navigation system information, cell phone triangulation information, and so on.

The video module 108 can process the video content 110 utilizing a variety of information and resources. For example, the video module 108 can process the video content 110 using geographical information 114 and/or user information 116. The geographical information 114 can include one or more geographical models, examples of which are given above. The geographical information can also include annotation information that can be used to annotate the video content 110, such as information that identifies geographical locations. The user information 116 can include user identification information, user preferences, and so on.

In addition to accessing one or more local resources, the computing device 102 is also configured to access a geographical resource 118 via a network 120. Suitable examples of the network 120 include the Internet, a wide area network, a local area network, and so on. The geographical resource 118 includes a geographical database 122, a video processor 124, and a video correlation module 126. The geographical database 122 stores one or more geographical models that can be accessed by the computing device 102. The video processor 124 is configured to perform a variety of functionalities, such as video content calibration. For example, in some embodiments the video content 110 is uploaded to the geographical resource 118 and the video processor 124 calibrates the video content 110 to one or more geographical models and/or existing calibrated video content. The video correlation module 126 is operable to correlate a particular instance of video content with other instances of video content based on similar geographical information, similar position information, similar annotations, similar user preferences, and so on.

The operating environment 100 also includes a video device 128 that is operable to capture video content. Although the video device 128 is illustrated as a video camera, any suitable device with video capture functionality may be employed to capture video content without departing from the spirit and scope of the claimed embodiments.

Computing device 102 can be embodied as any suitable computing device such as, by way of example and not limitation, a desktop computer, a portable computer, a handheld computer such as a personal digital assistant (PDA), cell phone, and the like.

Having considered an example operating environment, consider now a discussion of example methods for implementing one or more of the techniques discussed herein for calibrating and annotating video content. The example methods are discussed with reference to environment 100 above.

Example Methods

Figure 2:
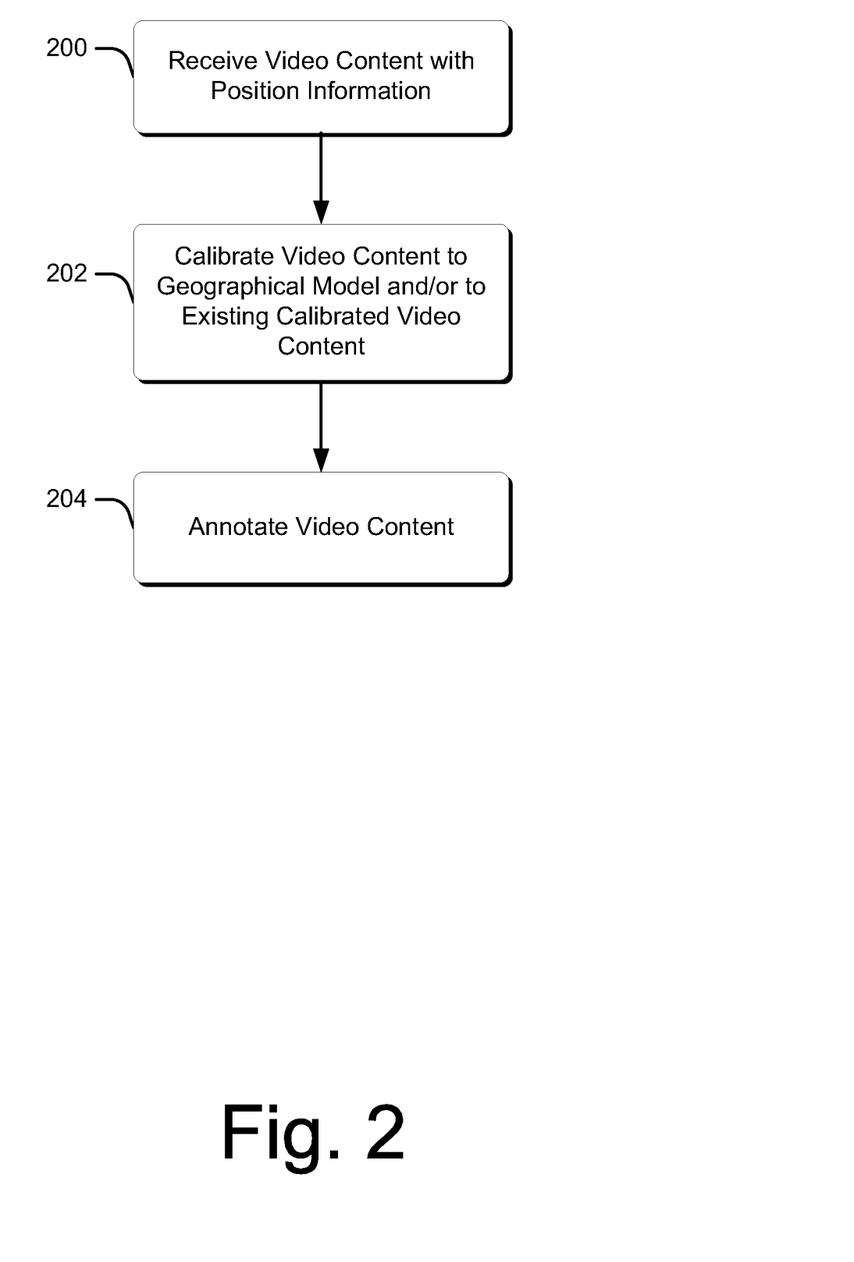
FIG. 2 is a flow diagram that describes steps in a method in accordance with one or more embodiments.

FIG. 2 is a flow diagram that describes a method in accordance with one or more embodiments. The method can be implemented in connection with any suitable hardware, software, firmware, or combination thereof. In at least some embodiments, the method can be implemented by software executing or executable (e.g., the video module 108 or the video processor 124) to enable calibration and annotation of video content.

Step 200 receives video content with position information. As discussed above, the position information can include, by way of example and not limitation, GPS information, IMU information, and so on. In some embodiments, a device that captures the video content (e.g., video device 128) includes functionality for capturing the position information and associating the position information with the video content. Thus, in at least some embodiments, each frame in a particular instance of video content can be associated with GPS coordinates, IMU data, and so on.

Step 202 calibrates the video content to one or more geographical models and/or to existing calibrated video content. A variety of calibration techniques can be utilized. In some embodiments, one or more key frames of the video content can be matched to specific locations in a geographical model. Each of the key frames can have position information that can be matched to similar position information of the geographical model. The video content calibration can be propagated between key frames by matching the features of images within the video content. One suitable method for matching features involves using a scale-invariant feature transform (SIFT) to detect image features and track detected image features as images within the video content frames move.

Additionally and/or alternatively, a first instance of video content can be calibrated using a second instance of video content that is already calibrated. For example, if the second instance of content was captured at a similar location to that of the first instance of content (e.g., outside the Empire State Building), image matching can be performed between the second instance and the first instance of video content. Calibration data, such as position information, can then be propagated from the second instance to the first instance of video content.

Step 204 annotates the video content. According to some embodiments, annotating video content can include attaching text labels to particular features of the video content. Annotating video content is not limited to text labels, however, and any suitable type of media can be associated with features of video content, such as photographs, video, audio, hyperlinks, and so on. In some embodiments, annotations may be retrieved from a geographical database, from other video content, and/or provided by user input.

According to some embodiments, calibration of video content can also allow an instance of video content to be indexed such that the instance of video content can be searchable by one or more locations and/or annotations. For example, in some embodiments, a user can search an instance of calibrated video content by providing a search term, such as a location name, to a video searching function (e.g., as part of the video module 108). Thus, in some implementations, playback of the instance of calibrated video content can jump directly to a portion of the video content that is associated with the search term.

Figure 3:
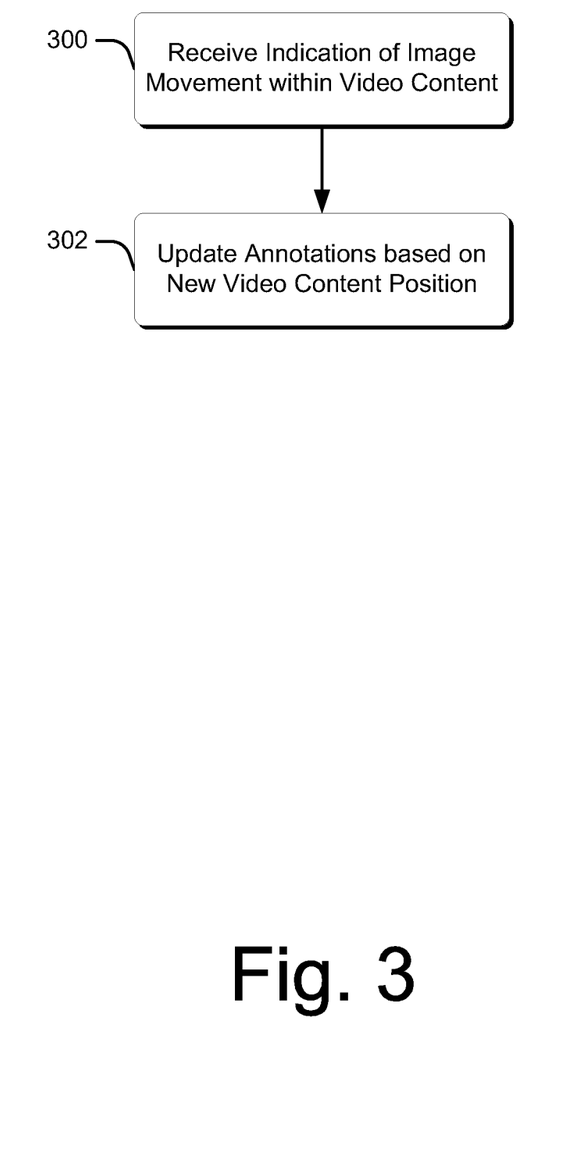
FIG. 3 is a flow diagram that describes steps in a method in accordance with one or more embodiments.

FIG. 3 is a flow diagram that describes a method in accordance with one or more embodiments. The method can be implemented in connection with any suitable hardware, software, firmware, or combination thereof. In at least some embodiments, the method can be implemented by software executing or executable (e.g., the video module 108 or the video processor 124) to update video content annotations.

Step 300 receives an indication of image movement within video content. Indications of image movement can include an indication of panning left or right, tilting up or down, zooming in or out, and so on. According to some embodiments, as video content advances from one frame to the next, a change in position information may be detected. For example, GPS coordinates associated with an edge of a video frame can indicate that the video frames are moving in a particular direction, such as north, south, east, west, and so on. Additionally and/or alternatively, a change in IMUs can indicate that the device that captured the video content is panning left or right, rotating, and so on.

Step 302 updates one or more annotations based on a new position associated with one or more frames of the video content. According to some embodiments, the annotations are updated responsive to receiving the indication of image movement as in step 300. For example, a camera recording the video content may have panned such that a location that was annotated in a previously-displayed frame is no longer displayed. Thus, the annotation for such a location can leave the displayed frames with the associated location. As a further example, one or more new locations may be displayed in the current frame and annotations for the new locations can be added. Thus, according to some embodiments, the techniques discussed herein enable video content annotations to be dynamically updated based on a change of the images displayed in video content.

Figure 4:
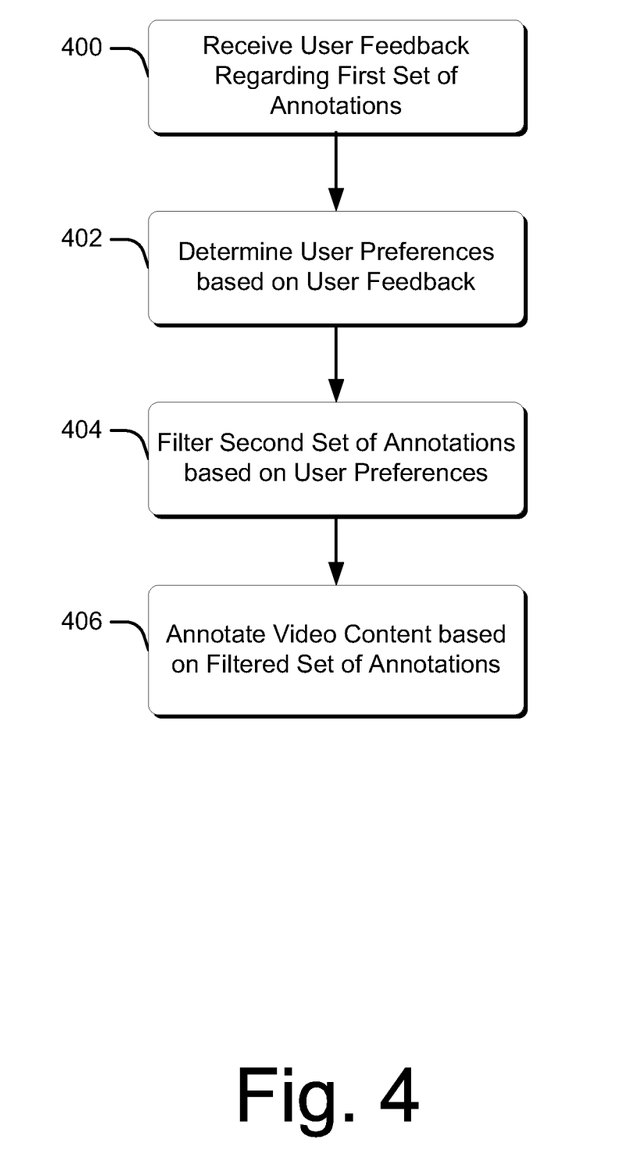
FIG. 4 is a flow diagram that describes steps in a method in accordance with one or more embodiments.

FIG. 4 is a flow diagram that describes a method in accordance with one or more embodiments. The method can be implemented in connection with any suitable hardware, software, firmware, or combination thereof. In at least some embodiments, the method can be implemented by software executing or executable (e.g., the video module 108 or the video processor 124) to filter video content annotations based on user preferences.

Step 400 receives user feedback regarding a first set of annotations. For example, a user can indicate a preference for a particular annotation or class of annotations by selecting a "thumbs up" icon or some other displayed indicia, or can indicate that the user does not prefer a particular annotation or class of annotations by selecting a "thumbs down" icon or some other displayed indicia. It is to be appreciated, however, that any suitable way of providing and/or receiving user feedback can be employed.

Figure 7:
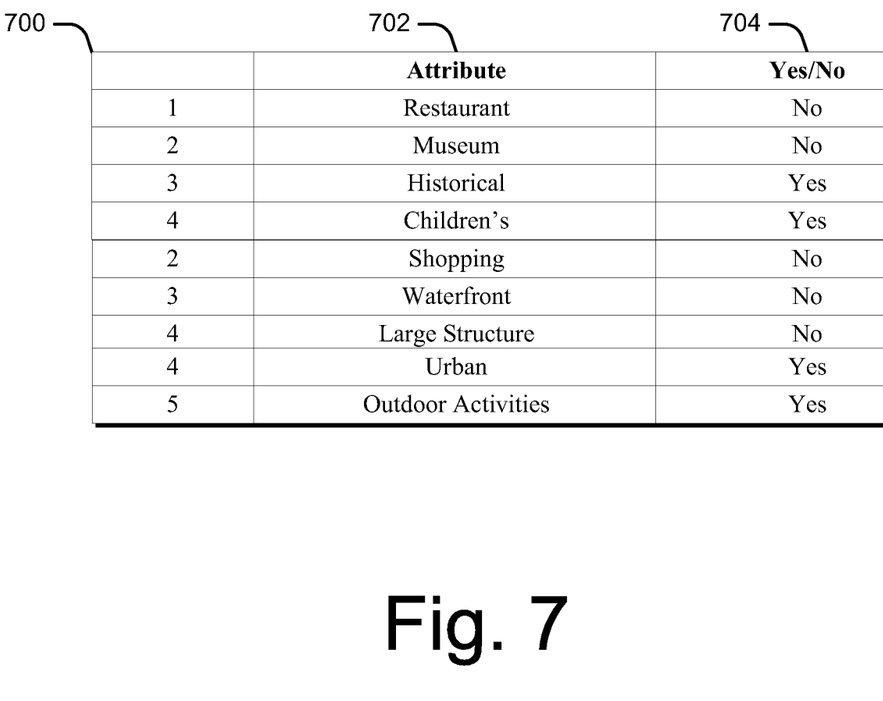
FIG. 7 illustrates an example table of video content attributes in accordance with one or more embodiments.

Step 402 determines user preferences based, at least in part, on the received user feedback. According to some embodiments, one or more annotations in the first set of annotations can have one or more attributes that can be used to determine user preferences. For example, an annotation identifying the Empire State Building can include the attributes of "large building", "historical significance", "tourist site", and so on. A table listing example attributes is illustrated in FIG. 7.

Step 404 filters a second set annotations based, at least in part, on the user preferences. According to some embodiments, when a user indicates a preference or non-preference for particular annotations, the attributes associated with the particular annotations can be used to filter other annotations. One example way of filtering annotations includes using annotation attributes to calculate a probability that a particular annotation will correspond to one or more user preferences. Annotations with a high probability can be added to video content and annotations with a low probability can be omitted. Suitable ways of calculating probability include, by way of example and not limitation, using k-means clustering, support vector machines, and so on. In some embodiments, the second set of annotations may include different annotations than the first set or one or more of the same annotations included in the first set.

According to some embodiments, annotations can also be filtered using a ranking system. For example, annotations with a higher probability of corresponding to a user preference (e.g., an annotation that corresponds to a greater number of preferred attributes) can be ranked higher. Annotations with a lower probability of corresponding to user preferences can be ranked in order of descending probability. Thus, according to some embodiments, higher-ranked annotations (e.g., the top 50%) can be added to video content. Additionally and/or alternatively, a user can indicate a percentage of ranked annotations to be added to video content.

According to some further embodiments, annotators that provide annotations can also be ranked. For example, if a particular user frequently selects annotations from a particular annotator (e.g., another user) to be used to annotate video, annotations from the annotator can be given a higher rank when annotations are filtered.

Step 406 annotates video content based on a filtered set of annotations. For example, if a first group of attributes is associated with annotations that a user prefers, then other annotations that share one or more of these preferred attributes can be included with video content. As a further example, if a second group of attributes is associated with annotations that a user does not prefer, then other annotations that share one or more of these non-preferred attributes can be omitted from video content.

Figure 5:
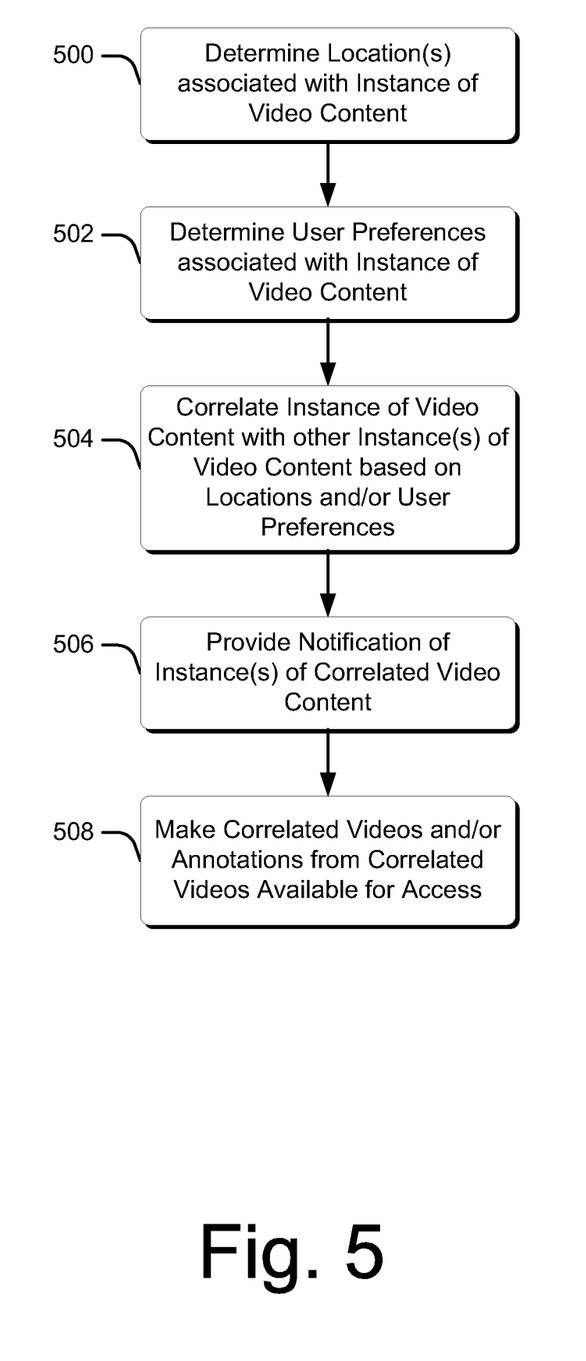
FIG. 5 is a flow diagram that describes steps in a method in accordance with one or more embodiments.

FIG. 5 is a flow diagram that describes a method in accordance with one or more embodiments. The method can be implemented in connection with any suitable hardware, software, firmware, or combination thereof. In at least some embodiments, the method can be implemented by software executing or executable (e.g., the video correlation module 126) to correlate video content.

Step 500 determines one or more locations associated with an instance of video content. For example, the first instance of video content may include content captured in the Art Deco District of Miami Beach. Thus, location information (e.g., GPS coordinates) associated with the first instance of video content can indicate this location.

Step 502 determines user preferences associated with the first instance of video content. Example ways of determining user preferences are discussed above and below. Step 504 correlates the first instance of video content with one or more other instances of video content based on the determined locations and/or user preferences. In the example mentioned above, another instance of video content can be identified that includes the Art Deco District. As a further example, another instance of video content can be identified based on common and/or similar user preferences.

Step 506 provides a notification of the one or more other instances of correlated video content. For example, a user interface can be displayed that indicates that one or more other instances of video content are available that correlate with the first instance of video content based on a common location and/or user preferences. Step 508 makes the one or more instances of correlated video content and/or annotations from the one or more instances of correlated video content available for access. For example, the user can be presented with a hyperlink that, if selected, navigates to one of the correlated instances of video content. According to some embodiments, a user can also access annotations from a correlated instance of video content, and one or more of the annotations can be added to the first instance of video content.

Having discussed example methods according to one or more embodiments, consider now a discussion of an example user interface that can be utilized to implement the above-described embodiments.

Example User Interface

Figure 6:
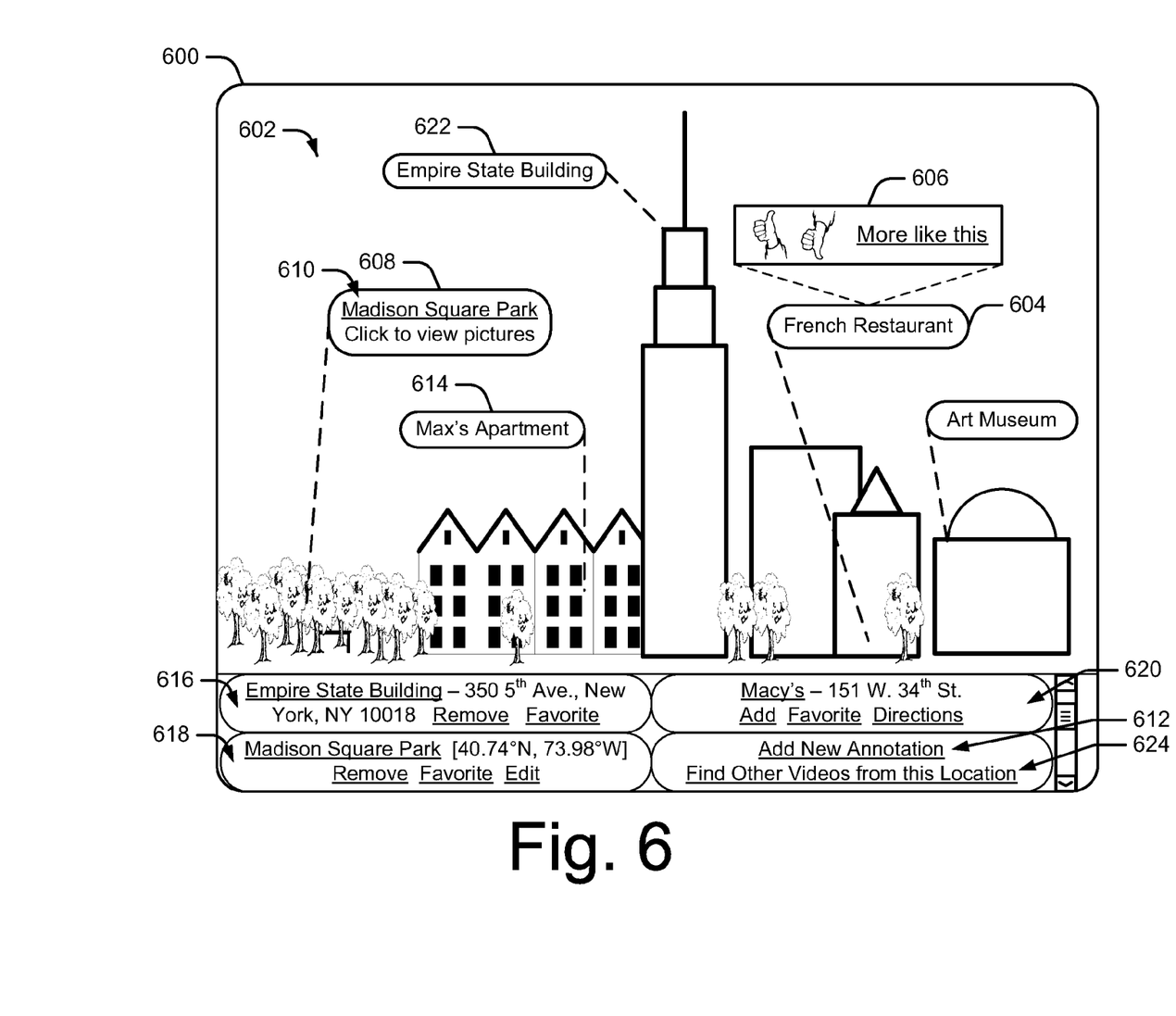
FIG. 6 illustrates an example user interface in accordance with one or more embodiments.

FIG. 6 illustrates an example user interface in accordance with one or more embodiments, generally at 600, for displaying video content and annotations of the video content. According to some embodiments, the user interface 600 can be associated with one or more media-enabled applications, such as a media player, a web browser, and so on. The user interface 600 can be displayed by a computing device, such as computing device 102 of FIG. 1.

In this example, user interface 600 displays video content 602. The user interface 600 also includes a variety of annotations, such as an annotation 604 that identifies a French restaurant that is displayed as part of the video content 602. The annotation 604 includes a feedback window 606 that enables a user to provide feedback regarding the annotation 604. According to some embodiments, the feedback window 606 can be displayed in response to a selection of the annotation 604 (e.g., via a mouse click). In this example, a user can select the "thumbs up" icon to indicate a preference for the annotation 604, or the user can select the "thumbs down" icon to indicate that the user does not prefer this annotation. The feedback window 606 also includes the phrase "More like this," which is selectable to locate one or more other annotations that have attributes similar to those of annotation 604. For example, the annotation 604 can have the attributes of "restaurant", "fine dining", "downtown", and so on. Thus, other annotations can be identified that share one or more of these attributes and can be added to the video content 602.

The user interface 600 also includes an annotation 608 that identifies Madison Square Park. According to some embodiments, annotations can be interactive to access and/or navigate to other content. In this particular example, the annotation 608 includes text 610 which is selectable to view one or more pictures associated with Madison Square Park. For example, if the text 610 is selected, one or more pictures can be displayed as part of the user interface 600. Alternatively, a selection of the text 610 can cause a navigation (e.g., via a web browser) to a different location, such as a website, that enables access to the pictures. Pictures are used for purposes of example only, and a variety of types of content can be associated with an annotation, such as video, audio, websites, and so on.

According to some embodiments, a user can add custom annotations to the video content 602. In this example, the user interface 600 includes a new annotation icon 612 that, if selected, enables a user to add a new annotation to the video content 602. In some embodiments, selecting the new annotation icon 612 causes a blank annotation to be displayed, which a user can then drag to a particular location of the video content 602 to associate the blank annotation with the location. The user can provide content into the blank annotation, such as text, a hyperlink, an image, and so on. Selecting the new annotation icon 612 can also enable a user to locate annotations from other instances of video content that may be relevant to the video content 602. For example, other instances of video content that include one or more similar locations to those displayed in video content 602 (e.g., correlated video content) can include annotations that can be selected and added to the video content 602.

User interface 600 includes, in at least some embodiments, a custom annotation 614 that was added via selection of the new annotation icon 612. In addition to associating the custom annotation 614 with the video content 602, the custom annotation 614 can be shared such that it can be added to other instances of video content. In one or more embodiments, several annotation controls can be included in user interface 600, such as annotation controls 616, 618, and 620. According to some embodiments, the annotation controls can be associated with annotations that are displayed as part of video content 602 or associated with annotations that are not currently displayed but are available to be displayed. For example, the annotation control 616 is associated with an annotation 622 and is selectable to enable control of the annotation 622. Selecting the "Remove" text of the annotation control 616 causes the annotation 622 to be removed from the video content 602. Selecting the "Favorite" text of the annotation control 616 causes the annotation 622 and/or its associated attributes to be added to a list of the user's favorites.

The annotation control 618 is associated with the annotation 608 and is selectable to invoke functionality to remove and/or favorite the annotation 608. The annotation control 618 is also associated with "Edit" functionality that enables the annotation 608 to be edited. Editing the annotation 608 can include removing content from and/or adding content to the annotation 608. As illustrated, the annotation control 618 also includes GPS coordinates for Madison Square Park. As part of the user interface 600, the annotation control 620 is associated with an annotation that is not currently displayed as part of the video content 602. According to some embodiments, the annotation control 620 is associated with a location included in the video content 602. For example, the location (Macy's) may be displayed in video content 602 but not currently annotated. Thus, the annotation control 620 is selectable to invoke functionality to add the annotation to the video content 602, such as by selecting the "Add" text. Annotation control 620 is also selectable to invoke functionality for obtaining directions (e.g., driving directions) to a location associated with the annotation control 620.

According to some embodiments, the annotation controls displayed as part of the user interface 600 are dynamically updated as one or more locations displayed as part of the video content 602 change. For example, if the video content 602 pans away from a location such that the location is no longer displayed as part of the video content, an annotation control associated with the location can be removed from the user interface 600. Additionally and/or alternatively, if the video content 602 pans to a new location that was not previously displayed, an annotation control associated with the new location can be added to the user interface 600.

User interface 600 also includes, in one or more embodiments, a find videos icon 624 that is selectable to invoke functionality to locate one or more other videos that correlate to video content 602. For example, selecting find videos icon 624 can cause a search to be conducted for other videos (e.g., from the same user or a different user) that were captured near the Empire State Building.

The arrangement of visual elements included in the user interface 600 is for purposes of example only, and it is to be appreciated that any suitable arrangement of visual elements may be utilized without departing from the spirit and scope thereof.

Example Attribute Table

FIG. 7 illustrates an example attribute table 700 in accordance with one or more embodiments. The attribute table 700 can be used to track attributes, such as geographical attributes, for one or more locations and/or annotations associated with video content. For example, the attribute table 700 can be associated with a particular annotation, such as annotation 608 of FIG. 6. The attribute table 700 lists in column 702 a plurality of example attributes, and column 704 indicates if an attribute applies to an associated location and/or annotation. For example, "Yes" indicates that an attribute applies to a particular location and/or annotation, and "No" indicates that an attribute does not apply to a particular location and/or annotation. These particular attributes are listed for purposes of example only, and any suitable attribute may be utilized. According to one or more embodiments, if a user indicates a preference for an annotation associated with the attribute table 700, the attributes that apply to the annotation can be used to determine a probability that the user will prefer other annotations that share one or more common attributes with attribute table 700. Example ways of determining this probability are discussed above.

Example System

Figure 8:
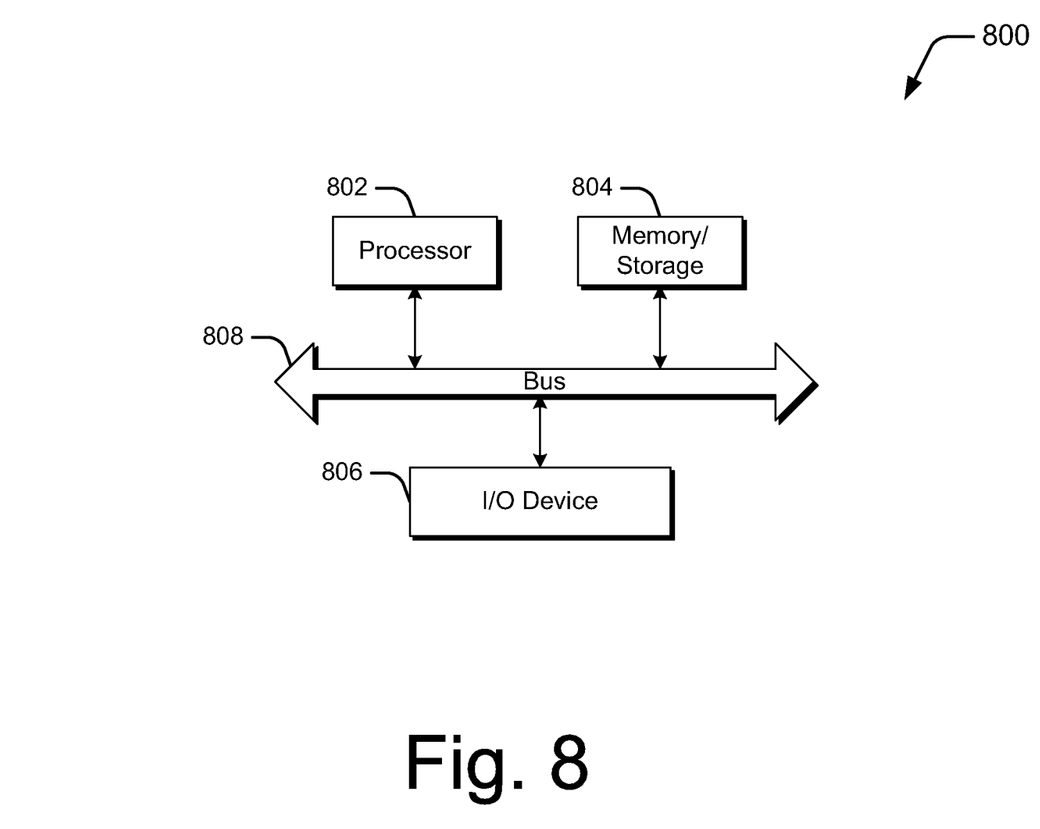
FIG. 8 is a block diagram of a system in accordance with one or more embodiments.

FIG. 8 illustrates an example computing device 800 that can implement the various embodiments described above. Computing device 800 can be, for example, computing device 102 of FIG. 1 or any other suitable computing device.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or nonvolatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a touch input device (e.g., a touch screen), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media are configured to store information and thus exclude transitory signals.

CONCLUSION

Various embodiments provide techniques for calibrating and annotating video content. In one or more embodiments, an instance of video content can be calibrated with one or more geographical models and/or existing calibrated video content to correlate the instance of video content with one or more geographical locations. According to some embodiments, geographical information can be used to annotate the video content. Geographical information can include identification information for one or more structures, natural features, and/or locations included in the video content. Some embodiments enable a particular instance of video content to be correlated with other instances of video content based on common geographical information and/or common annotation information. Thus, a user can access video content from other users with similar travel experiences and/or interests. A user may also access annotations provided by other users that may be relevant to a particular instance of video content.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A computer-implemented method comprising:
   receiving, with a computing device, an instance of video content that includes position information;
   determining one or more locations associated with the instance of video content;
   correlating the instance of video content with a different instance of video content based on the one or more locations, the different instance of video content including calibrated video content;
   matching one or more images from the instance of video content to one or more images of the different instance of video content;
   calibrating, with the computing device and based at least in part on said matching, the instance of video content by automatically propagating geographical position information associated with the different instance of video content to the instance of video content such that the instance of video content is provided and calibrated with the geographical position information to generate a calibrated version of the instance of video content;
   causing a notification of the different instance of video content to be presented;
   receiving a user input of a search term;
   searching the calibrated version of the instance of video content for a geographical location that corresponds to the search term; and
   causing playback of the calibrated version of the instance of video content to jump directly to a portion of the calibrated version of the instance of video content that is associated with the search term.

2. The computer-implemented method of claim 1, wherein the geographical position information comprises one or more of Global Positioning System (GPS) information or inertial measurement units.

3. The computer-implemented method of claim 1, further comprising outputting geographical information that identifies one or more geographical locations included in the calibrated version of the instance of video content.

4. The computer-implemented method of claim 1, further comprising:
   causing, with the computing device, the calibrated version of the instance of video content to be displayed;
   receiving, the computing device, an indication of image movement within the calibrated version of the instance of video content; and
   updating, with the computing device, one or more annotations of the calibrated version of the instance of video content based on the image movement.

5. The computer-implemented method of claim 4, further comprising updating, with the computing device, one or more of the annotations by removing an annotation associated with an image that is no longer displayed in a currently-displayed frame of the calibrated version of the instance of video content.

6. The computer-implemented method of claim 4, further comprising updating, with the computing device, one or more of the annotations by adding an annotation for a new image that is displayed as part of the calibrated version of the instance of video content.

7. The computer-implemented method of claim 1, further comprising:
   receiving, with the computing device, user feedback regarding one or more annotations of the calibrated version of the instance of video content; and
   filtering, with the computing device, one or more of the annotations based on the user feedback.

8. The computer-implemented method of claim 1, further comprising:
   retrieving, with the computing device, one or more annotations from the different instance of video content; and
   associating, with the computing device, the one or more annotations with the calibrated version of the instance of video content.

9. The computer-implemented method of claim 1, wherein the calibrated version of the instance of video content includes one or more annotations comprising one or more of an image, audio content, or a hyperlink.

10. One or more computer storage media embodying computer-executable instructions that are executable to cause one or more computing devices to perform operations comprising:
    receiving, with a computing device, an instance of video content with position information;
    determining one or more locations associated with the instance of video content;
    correlating the instance of video content with different instance of video content based on the one or more locations, the different instance of video content including calibrated video content;
    matching one or more images from the instance of video content to one or more images of the different instance of video content;
    calibrating, with the computing device and based at least in part on said matching, the instance of video content by automatically propagating geographical position information associated with the different instance of video content to the instance of video content such that the first instance of video content is provided and calibrated with the geographical position information to generate a calibrated version of the instance of video content;
    causing a notification of the different instance of video content to be presented;
    receiving a user input of a search term;
    searching the calibrated version of the instance of video content for a geographical location that corresponds to the search term; and
    causing playback of the calibrated version of the instance of video content to jump directly to a portion of the calibrated version of the instance of video that is associated with the search term.

11. The one or more computer storage media as recited in claim 10, wherein the geographical position information associated with the different instance of video content comprises geographical coordinates.

12. The one or more computer storage media as recited in claim 10, wherein the operations comprise:
    retrieving one or more annotations from the different instance of video content; and
    associating the one or more annotations with the calibrated version of the instance of video content.

13. The one or more computer storage media as recited in claim 12, wherein one or more of the annotations include geographical information about one or more of the locations.

14. The one or more computer storage media as recited in claim 10, wherein the operations comprise:
    determining one or more user preferences associated with the calibrated version of the instance of video content; and
    wherein said correlating further comprises correlating the calibrated version of the instance of video content with the different instance of video content based on the one or more user preferences.

15. A system comprising:
one or more processors; and
one or more computer storage media storing instructions that are executable by the one or more processors to cause the system to perform operations including:
- receiving an instance of video content with position information;
- determining one or more locations associated with the instance of video content;
- correlating the instance of video content with a different instance of video content based on the one or more locations, the different instance of video content including calibrated video content;
- matching one or more images from the instance of video content to one or more images of the different instance of video content;
- calibrating, based at least in part on said matching, the instance of video content by automatically propagating geographical position information associated with the different instance of video content to the instance of video content such that the instance of video content is provided and calibrated with the geographical position information to generate a calibrated version of the instance of video content;
- causing a notification of the different instance of video content to be presented;
- receiving a user input of a search term;
- searching the calibrated version of the instance of video content for a geographical location that corresponds to the search term; and
- causing playback of the calibrated version of the instance of video content to jump directly to a portion of the calibrated version of the instance of video that is associated with the search term.

16. The system of claim 15, wherein the operations further include displaying one or more annotations of one or more geographical locations of the calibrated version of the instance of video content.

17. The system of claim 16, wherein the operations further include:
- causing the calibrated version of the instance of video content to be displayed;
- receiving, the computing device, an indication of image movement within the calibrated version of the instance of video content; and
- updating, with the computing device, the one or more annotations of calibrated version of the instance of video content based on the image movement.

18. The system of claim 15, wherein the operations further include propagating one or more annotations of geographical locations from the different instance of video content to the calibrated version of the instance of video content.

19. The system of claim 15, wherein the operations further include:
- receiving user feedback regarding one or more annotations of the calibrated version of the instance of video content; and
- filtering one or more of the annotations based on the user feedback.

20. The system of claim 15, wherein the calibrated version of the instance of video content includes one or more annotations comprising one or more of an image, audio content, or a hyperlink.

* * * * *